United States Patent
Soulier

(10) Patent No.: US 9,841,760 B2
(45) Date of Patent: Dec. 12, 2017

(54) SYSTEM FOR REMOTELY-OPERATED SYSTEMS

(71) Applicant: SAFRAN ELECTRONICS & DEFENSE, Boulogne-Billancourt (FR)

(72) Inventor: Jeremie Soulier, Boulougne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 0 days.

(21) Appl. No.: 15/324,252

(22) PCT Filed: Jul. 8, 2015

(86) PCT No.: PCT/EP2015/065638
§ 371 (c)(1),
(2) Date: Jan. 5, 2017

(87) PCT Pub. No.: WO2016/005469
PCT Pub. Date: Jan. 14, 2016

(65) Prior Publication Data
US 2017/0160739 A1 Jun. 8, 2017

(30) Foreign Application Priority Data
Jul. 8, 2014 (FR) ...................................... 14 01530

(51) Int. Cl.
*G05D 1/00* (2006.01)
*G05D 3/00* (2006.01)
(Continued)

(52) U.S. Cl.
CPC ......... *G05D 1/0022* (2013.01); *B64C 39/024* (2013.01); *G08G 5/0013* (2013.01);
(Continued)

(58) Field of Classification Search
CPC ................ G05D 1/0022; B64C 39/024; B64C 2201/146; G08G 5/0013; G08G 5/0034; H04L 63/123; H04L 63/126; H04W 12/10
See application file for complete search history.

(56) References Cited

U.S. PATENT DOCUMENTS 5,739,787 A * 4/1998 Burke ...................... F41G 7/006
244/3.2
9,148,443 B2 * 9/2015 Chizeck ................ G06F 21/316
(Continued)

FOREIGN PATENT DOCUMENTS

EP        1956451 A1    8/2008
WO   WO-2011080517 A2   7/2011

OTHER PUBLICATIONS

French Search Report with English language cover sheet, dated Jun. 9, 2015, FR Appication No. 1401530.
(Continued)

*Primary Examiner* — Nicholas Kiswanto
*Assistant Examiner* — Rachid Bendidi
(74) *Attorney, Agent, or Firm* — Blakely Sokoloff Taylor & Zafman LLP

(57) ABSTRACT

The invention relates to a remote-controlled system comprising: —at least one ground interface (3), from which an operator can control a remote-controlled vehicle; —at least one mission unit (7, 8) in said vehicle; and —a data link between said interface (3) and said mission unit (7, 8). Said system is characterized in that it comprises, on the ground and in the vehicle, security monitoring systems (6, 10) suitable for approving and/or authenticating critical data and/or commands exchanged between the ground and the vehicle and also suitable for verifying the integrity of said data. It is thus possible to use, on the ground as on board the vehicle, interfaces and units with a low level of criticality at
(Continued)

the same time as interfaces and units with the highest level of criticality.

11 Claims, 3 Drawing Sheets

(51) Int. Cl.
| | | |
|---|---|---|
| *G06F 7/00* | (2006.01) | |
| *G06F 17/00* | (2006.01) | |
| *H04L 29/06* | (2006.01) | |
| *H04W 12/10* | (2009.01) | |
| *G08G 5/00* | (2006.01) | |
| *B64C 39/02* | (2006.01) | |

(52) U.S. Cl.
CPC ......... *G08G 5/0034* (2013.01); *H04L 63/123* (2013.01); *H04L 63/126* (2013.01); *H04W 12/10* (2013.01); *B64C 2201/146* (2013.01)

(56) References Cited

U.S. PATENT DOCUMENTS

| | | | |
|---|---|---|---|
| 2003/0227395 A1 | 12/2003 | Zeineh | |
| 2006/0168453 A1* | 7/2006 | Da Silva Neto ... | G05B 19/0426 713/182 |
| 2008/0172744 A1 | 7/2008 | Schmidt et al. | |
| 2012/0303145 A1* | 11/2012 | Bennett ............. | G05B 19/0425 700/90 |
| 2013/0040657 A1* | 2/2013 | Jackson ................. | G06F 21/84 455/456.1 |
| 2014/0068770 A1 | 3/2014 | Chizeck et al. | |

OTHER PUBLICATIONS

International Search Report with English language translation, dated Oct. 1, 2015, PCT Application No. PCT/EP2015/065638.
International Preliminary Report on Patentability with English language translation, dated Aug. 18, 2016, PCT Application No. PCT/EP2015/065638.

* cited by examiner

SYSTEM FOR REMOTELY-OPERATED SYSTEMS

GENERAL TECHNICAL FIELD AND PRIOR ART

The present invention relates to remotely-operated systems such as airborne or earth-borne drones.

Remotely-operated systems are equipped with data links which are either internal data links that the remote-operator totally controls, or data links which are external relatively to the remote-operator (SATCOM for example).

In the case of an external data link, the integrity of the link is not controlled.

To date, only the use of an internal data link gives the remote-operator the possibility of guaranteeing the integrity of the information transmitted to the remotely-operated vehicle and of certifying the whole remotely operated system.

This certification nevertheless requires the deployment of significant means and may prove to be of a prohibitive cost.

In particular, the remotely-operated systems are called to fulfill their mission in an increasingly automated way by resorting to potentially highly scalable navigation algorithms not necessarily deterministic (or for which convergence will not be able to be demonstrated) based on multi-sensor information.

As for the ground operator interfaces, they are complex and potentially heterogeneous (in the majority of cases, these interfaces/supports cannot be certified).

A general purpose of the invention is to solve these problems and to propose an architecture allowing certification of the monitoring and control chain at a low cost.

In particular, the remote-operator which has the actual control of the remotely-operated vehicle has to check the safety parameters of the flight and in particular

- have the control of the trajectory of the remotely-operated vehicle (not leaving the area thereof),
- have the control of the fallout area in the case of an engine failure or of a "crash" (of course any uncontrolled "crash" should be avoided in order not to risk any accidents on the forbidden areas such as highly populated areas and allowing, in the case of difficulties, optimization of a landing on more favorable areas should be allowed),
- permanently monitoring the condition of the different sub-assemblies involved in the safety of the flight (energy, motorization, control links, navigation, . . . ).

GENERAL PRESENTATION OF THE INVENTION

For this purpose, the invention proposes a remotely-operated system including:

- at least one interface on the ground from which a remote-operator may control a remotely-operated vehicle,
- at least one mission assembly in said remotely-operated vehicle,
- a data link between said interface and said mission assembly,
- characterized in that it includes on the ground and in the remotely-operated vehicle safety checking systems adapted for signing and/or authenticating critical data and/or commands exchanged between the ground and the remotely-operated vehicle, and/or for checking the integrity of these data, and in that one of the safety checking systems in the remotely-operated vehicle is adapted for checking whether the remotely-operated vehicle is maintained in a safety coverage predefined by the ground and for triggering a predetermined safety action when this is not the case.

The authentication and the signature of the data give the possibility of providing the remote-operator with means for guaranteeing the received commands on-board and the information used for making a decision (airplane position, condition of the critical sub-assemblies).

Checking the integrity gives the possibility of guaranteeing that the orders emitted by the remote-operator, like the pieces of information which he/she receives, have not been modified by the transmission chain.

Thus, it is possible to use both on the ground and on-board the vehicle, interfaces and mission assemblies with a low criticality level, at the same time as interfaces and mission assemblies with a higher criticality level.

In a possible alternative of the invention, an independent safety data link chain is provided in order to allow triggering of the predetermined safety action from the ground.

Still in another alternative, the safety checking system of the vehicle is adapted for receiving a series of simple orders from the air traffic control.

PRESENTATION OF THE FIGURES

Other features and advantages of the invention will further emerge from the description which follows, which is purely illustrative and non-limiting, and should be read with reference to the appended figures wherein.

DESCRIPTION OF ONE OR SEVERAL EMBODIMENTS

Figure 1:
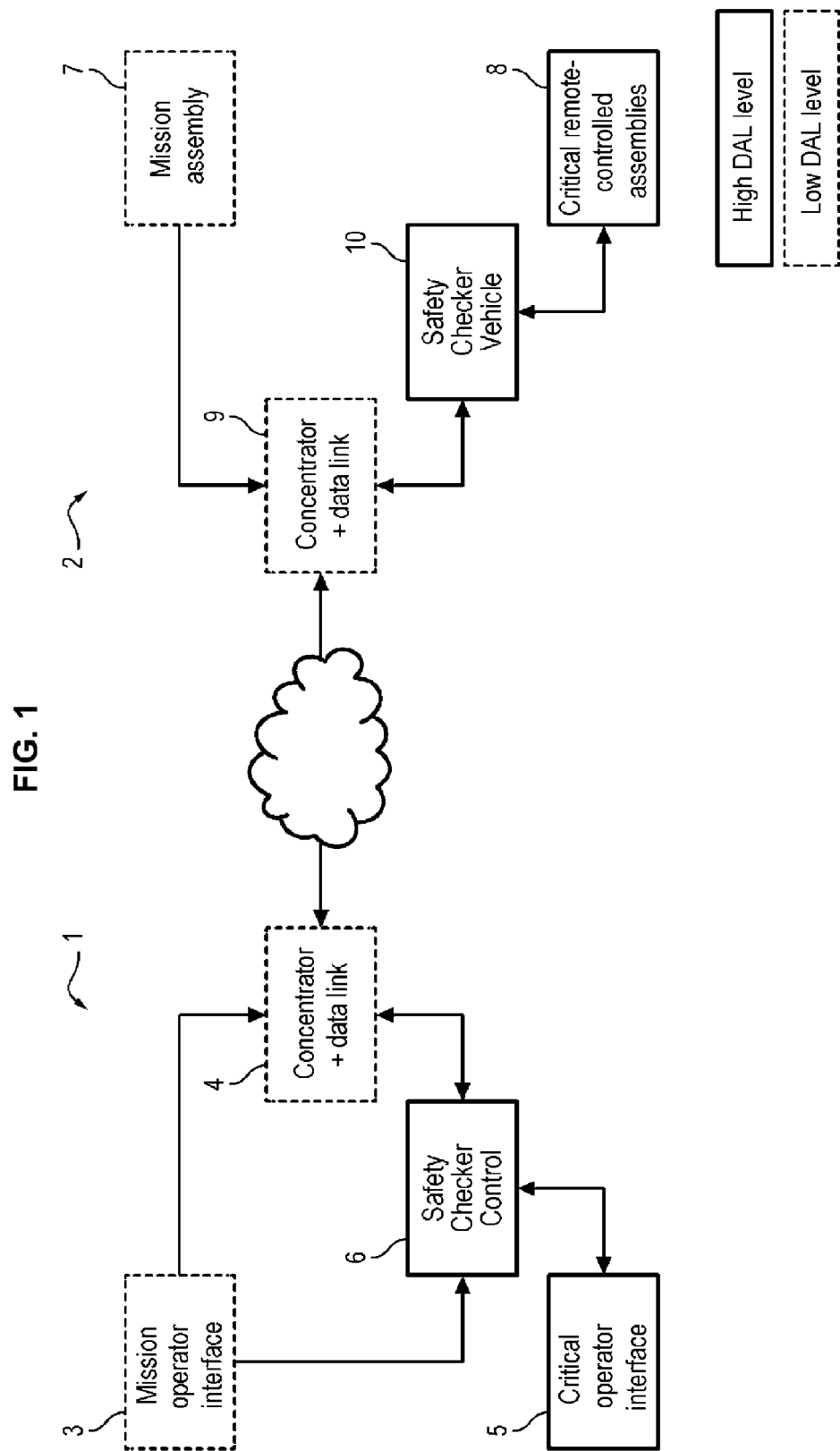
FIG. 1 illustrates a block diagram of a possible application of the invention.

The architecture illustrated in FIG. 1 includes a ground part 1 and a part 2 on the remotely-operated vehicle.

On the ground, the architecture comprises at least one interface 3 from which a remote-operator may control the remotely-operated vehicle, a concentrator 4 giving the possibility of ensuring the data link with the vehicle, as well as a mission interface 5 which is of a higher criticality level (DAL or "Development Assurance Level") than the interface 3 and the concentrator 4.

A safety checking system 6 is provided on the ground. This system is also of a high criticality level and has the following functions:

- it signs the critical commands emitted by either one of the interfaces 3 and 5 intended for on-board the vehicle (ciphering application);
- it checks the integrity of the state data regularly received from on-board (position, status of the piece of equipment, etc.). The checking of integrity is accomplished both spatially and temporally. The condition received from on-board is then classified by the safety checking system 6 according to three states: functional, degraded, non-functional;
- it checks the consistency between the command emitted towards on-board and the command return which is transmitted from on-board by the critical mission assembly of the latter;
- it regularly transmits on-board requests for authentication (application of a challenge function);

it copies the instructions emitted by the mission interface 5 intended for on-board in order to control the latter (short safety loop).

A similar architecture is also provided on-board the vehicle. The latter integrates for this purpose one or several mission assemblies 7 of a low criticality level, one or several mission assemblies 8 with a high criticality level, a concentrator 9 giving the possibility of ensuring the link with the ground, and a safety checking system 10.

This safety checking system 10 is also with a high criticality level and applies the following controls:

it broadcasts towards the critical mission assembly 8 the command from the ground after decoding;

it checks the integrity of this command before its broadcasting towards the critical mission assembly 8;

it regularly emits authentication requests (challenge) intended for the interfaces 3 and 5 on the ground;

it checks the time validity of the commands from the ground (ageing);

it emits to the ground acknowledgments of instructions from the critical mission assembly 8;

it signs the controls and statuses issued from the critical mission assembly 8.

It will be noted here that the components and the algorithms signing the commands from the ground and signing the controls from on-board are identical.

Highly secured keys and robust mathematical algorithms are used for ensuring that the probability of receiving erroneous orders/states without being able to detect them is very low (less than a level equivalent to the function which it serves).

The casings of the different processing units used have an accurate internal clock reset on a same time base. The clock of these casings is selected to be robust towards loss of reference.

Moreover, the safety checking system 10 of the vehicle is capable of checking whether the vehicle is maintained in a safety coverage (three-dimensional area, critical status . . . ) predefined by the ground.

The remotely-operated vehicle comprises a navigation system, including a satellite positioning receiver (for example of the GPS type), and an inertial central unit.

The remotely-operated vehicle also comprises a configured processing module for determining, from position signals generated by the navigation system and by the inertial central unit, instantaneous position data of the remotely-operated vehicle. The position data of the remotely-operated vehicle include data representative of the instantaneous space coordinates of the remotely-operated vehicle (latitude, longitude and altitude), as well as possibly a protective radius. The protective radius defines a volume around the position defined by the instantaneous coordinates, in which the remotely-operated vehicle is found, taking into account uncertainties related to the measurement.

The position data of the remotely-operated vehicle are transmitted by the processing module to the safety checking system 10.

The safety checking system 10 compares the position data which it receives from the processing module with data representative of the defined safety coverage and transmitted by the ground.

In the case when the commands from on-board or the states of the critical mission assembly 8 are not compliant with this safety coverage, the safety checking system 10 triggers a predetermined action (isolation of the outer commands and/or applications of safety rules, for example).

The data representative of the safety coverage may comprise ranges of latitude, longitude and altitude, in which the remotely-operated vehicle has to be positioned.

According to a first possibility, the protective radius is calculated by the processing module located on-board the remotely-operated vehicle.

In this case, the protective radius is transmitted by the processing module to the safety checking system 10 on-board the remotely-operated vehicle with the position data.

The position data, including the protective radius, are transmitted by the safety checking system 10 located on-board to the safety checking system 6 located on the ground.

In return, the safety checking system 6 located on the ground transmits to the safety checking system 10 located on-board, the data representative of the safety coverage, in order to allow the safety checking system 10 located on-board to check whether the remotely-operated vehicle is maintained in the safety coverage.

The safety coverage may be determined on the ground from position data transmitted by the safety checking system 10 located on-board. The position data of the remotely-operated vehicle and the representative data of the safety coverage exchanged between the ground and the remotely-operated vehicle are signed by the emitter control system and authenticated by the receiver control system.

According to a second possibility, the protective radius is calculated by a processing module located on the ground.

This second possibility may in particular be useful if the calculation of the protective radius has to take into account the fact that one or two GNSS satellites may have failed. This calculation requires the use of a complex processing system, including a large filter bank which may advantageously be moved to the ground, wherein the available means do not have the same limitations as those on-board the remotely-operated vehicle and which may allow the processing of several remotely-operated vehicles at a time.

In this case, the space coordinates of the remotely-operated vehicle are transmitted by the safety checking system 10 located on-board to the safety checking system 6 located on the ground.

The processing module located on the ground calculates the protective radius depending on the instantaneous space coordinates of the remotely-operated vehicle (latitude, longitude and altitude, GNSS distance data to the different visible satellites), as well as the representative data of the protective coverage.

The safety checking system 6 located on the ground transmits to the safety checking system 10 located on-board, the representative data of the protective radius and of the safety coverage, in order to allow the safety checking system 10 located on-board to check whether the remotely-operated vehicle is maintained in the safety coverage.

The position data of the remotely-operated vehicle and the representative data of the protective radius and of the safety coverage exchanged between the ground and the remotely-operated vehicle are signed by the emitter control system and authenticated by the receiver control system.

Figure 2:
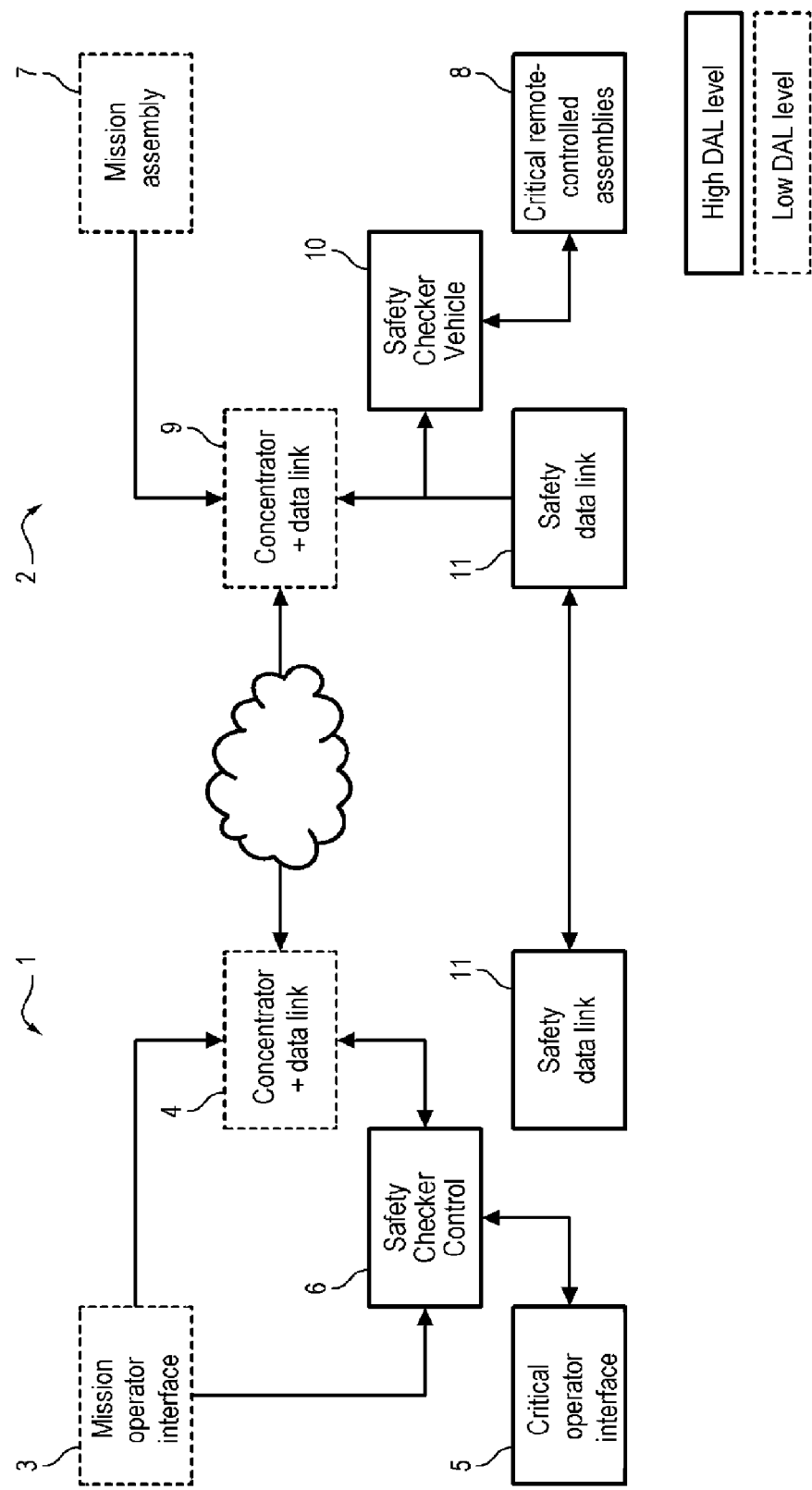
FIGS. 2 and 3 illustrate two other possible embodiments of the invention.

In still another alternative (FIG. 2—dedicated emergency chain of the system), the safety checking system 10 is capable of receiving a simple order (discrete type from a chain 11 for linking independent safety data). In this case, the safety checking system triggers a predetermined action (e.g.: isolation of the outer commands and/or applications of safety rules).

Figure 3:
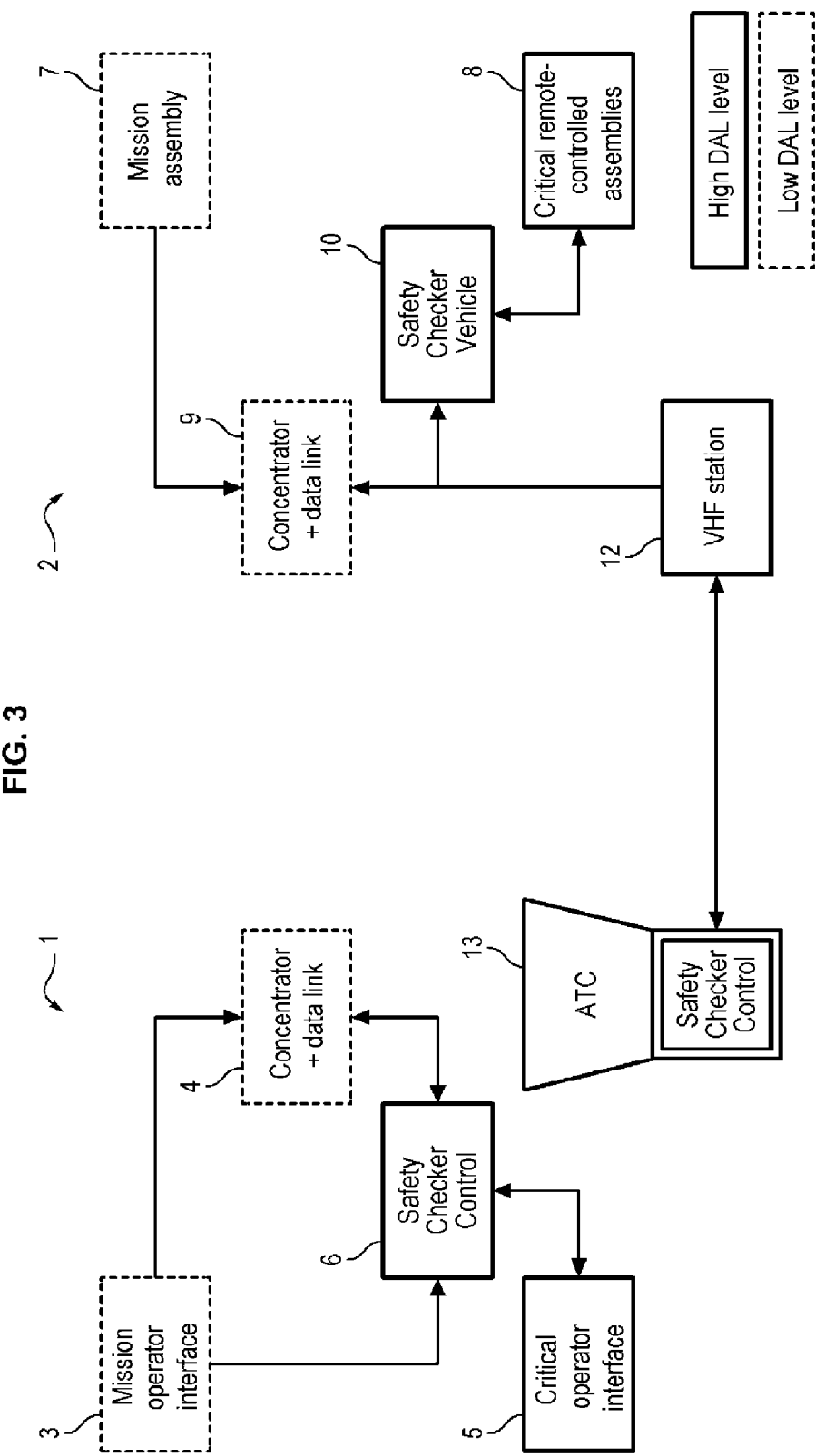

Also in a third alternative (FIG. 3—control taken by the air traffic control), in the case of a loss of control (either involuntary or voluntary), of the control station, the safety checking system of the remotely-operated vehicle is capable of receiving a series of simple orders from the air traffic control (station ATC 13) via a "VHF" link (station 12).

The authenticity of these commands is checked by a signature mechanism on the basis of keys exchanged between the ATC and the remote-operator beforehand.

The invention claimed is:

1. A remotely-operated system including:
   at least one first interface on a ground from which a remote-operator controls a remotely-operated vehicle,
   one second interface on the ground having a higher criticality level than the first interface on the ground,
   at least one mission assembly in the remotely-operated vehicle,
   a data link between said first and second interfaces and said mission assembly, the remotely-operated system including, on the ground and on-board the remotely-operated vehicle, safety checking systems for signing and/or authenticating critical data and/or commands exchanged between the ground and the remotely-operated vehicle, and/or for checking an integrity of the critical data and/or commands, the safety checking system on the ground for checking consistency between an emitted command data intended for the safety checking system on-board the remotely-operated vehicle and a command return which is transmitted from the remotely-operated vehicle by the mission assembly, and the safety checking system on-board the remotely-operated vehicle is for checking whether the remotely-operated vehicle is maintained in a safety coverage predefined by the ground safety checking system and for triggering a predetermined safety action when this is not the case.

2. The remotely-operated system according to claim 1, wherein the safety checking system on the ground is for signing the critical commands emitted by either one of the interfaces intended for the safety checking system on-board the remotely-operated vehicle and for checking the integrity of the state data received from the remotely-operated vehicle.

3. The remotely-operated system according to claim 1, wherein the safety checking system on the ground is for copying and controlling emitted command data intended for the safety checking system on-board the remotely-operated vehicle by a mission operator interface of high criticality.

4. The remotely-operated system according to claim 1, wherein the safety checking system on-board the remotely-operated vehicle is for authenticating the command data intended for a remotely-operated assembly of high criticality on-board the remotely-operated vehicle and for checking the integrity of said assembly of remotely-operated high criticality on-board the remotely-operated vehicle.

5. The remotely-operated system according to claim 1, wherein the safety checking system on-board the remotely-operated vehicle is for checking the temporal validity of the commands from the ground safety checking system.

6. The remotely-operated system according to claim 1, wherein the safety checking system on-board the remotely-operated vehicle is for emitting to the ground safety checking system acknowledgments of instructions from a critical assembly on-board the remotely-operated vehicle.

7. The remotely-operated system according to claim 1, wherein the safety checking system on-board the remotely-operated vehicle is for signing the controls and statuses issued from a critical assembly on-board the remotely-operated vehicle.

8. The remotely-operated system according to claim 1, wherein the safety checking system on the ground is for regularly transmitting authentication requests to the safety checking system on-board the remotely-operated vehicle.

9. The remotely-operated system according to claim 1, further including an independent safety data link chain in order to allow triggering of the predetermined safety action from the ground.

10. The remotely-operated system according to claim 1, wherein the safety checking system of the remotely-operated vehicle is for receiving a series of simple orders from an air traffic control system.

11. The remotely-operated system according to claim 1, wherein the safety checking system on-board the vehicle is adapted for regularly transmitting authentication requests to the safety checking system on the ground.

* * * * *